United States Patent
Norstedt et al.

(10) Patent No.: US 9,475,137 B2
(45) Date of Patent: Oct. 25, 2016

(54) MILLING TOOL FOR CHIP REMOVING MACHINING

(71) Applicant: SANDVIK INTELLECTUAL PROPERTY AB, Sandviken (SE)

(72) Inventors: Anders Norstedt, Sandviken (SE); Ulrik Sunnvius, Gavle (SE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 242 days.

(21) Appl. No.: 14/159,856

(22) Filed: Jan. 21, 2014

(65) Prior Publication Data

US 2014/0205387 A1    Jul. 24, 2014

(30) Foreign Application Priority Data

Jan. 23, 2013  (SE) ..................................... 1350072

(51) Int. Cl.
  *B23C 5/20*  (2006.01)
  *B23C 5/22*  (2006.01)
  *B23C 5/06*  (2006.01)

(52) U.S. Cl.
  CPC . *B23C 5/22* (2013.01); *B23C 5/06* (2013.01); *B23C 5/2208* (2013.01); *B23C 2210/166* (2013.01); *B23C 2210/168* (2013.01); *Y10T 407/191* (2015.01)

(58) Field of Classification Search
  CPC ................. B23C 2210/166; B23C 2210/168; B23C 5/22; B23C 5/2208; B23C 5/06
  USPC ........................ 407/113–116, 33, 34, 46, 101
  See application file for complete search history.

(56) References Cited

U.S. PATENT DOCUMENTS

| | | | | |
|---|---|---|---|---|
| 3,574,911 A | * | 4/1971 | Penoyar | B23C 5/207 407/114 |
| 4,979,849 A | * | 12/1990 | Kezran | B23B 27/06 407/103 |
| 5,322,395 A | * | 6/1994 | Cole | B23B 29/04 407/101 |
| 5,682,803 A | * | 11/1997 | Boianjiu | B23B 27/1614 407/101 |
| 5,888,029 A | * | 3/1999 | Boianjiu | B23B 27/1614 407/101 |
| 7,121,769 B2 | * | 10/2006 | Satran | B23C 5/08 407/40 |
| 7,320,563 B2 | * | 1/2008 | Muller | B23B 27/164 407/102 |
| 7,537,419 B2 | * | 5/2009 | Sjoberg | B23B 27/1611 407/103 |

(Continued)

FOREIGN PATENT DOCUMENTS

| | | |
|---|---|---|
| EP | 0300247 A1 | 1/1989 |
| JP | S6085816 A | 5/1985 |
| JP | 05116018 A * | 5/1993 |

*Primary Examiner* — Sara Addisu
(74) *Attorney, Agent, or Firm* — Corinne R. Gorski

(57) ABSTRACT

A milling tool is equipped with milling inserts, below which there are disposed shim plates, the primary function of which is to protect the basic body of the tool in the event of insert breakdowns. The shim plate is formed with a protuberance, in which an auxiliary cutting edge is included, which, in the assembled state of the tool, is located along an inactive cutting edge, which is situated radially inside an active chip removing cutting edge. By means of the auxiliary cutting edge, the milling tool can be utilized for ramping operations without risk of the inactive cutting edge of the milling insert being damaged.

8 Claims, 15 Drawing Sheets

(56) References Cited

U.S. PATENT DOCUMENTS

| | | | | |
|---|---|---|---|---|
| 7,785,045 B2 * | 8/2010 | Viol | B23B 27/1662 | 407/101 |
| 8,277,151 B2 * | 10/2012 | Wandeback | B23C 5/06 | 407/113 |
| 8,277,153 B2 * | 10/2012 | Kovac | B23C 5/06 | 407/103 |
| 8,568,064 B2 * | 10/2013 | Carl | B23B 27/1614 | 407/113 |
| 8,573,903 B2 * | 11/2013 | Morrison | B23C 5/2213 | 407/100 |
| 8,616,810 B2 * | 12/2013 | Kaufmann | B23B 27/143 | 407/114 |
| 8,858,130 B2 * | 10/2014 | Morrison | B23C 5/06 | 407/113 |
| 9,144,848 B2 * | 9/2015 | Konta | B23C 5/109 | |
| 2005/0244233 A1 * | 11/2005 | Jonsson | B23B 27/1618 | 407/116 |
| 2006/0083594 A1 * | 4/2006 | Ejderklint | B23B 27/1611 | 407/113 |
| 2006/0210365 A1 * | 9/2006 | Hecht | B23B 27/08 | 407/103 |
| 2007/0122242 A1 * | 5/2007 | Englund | B23B 27/1622 | 407/103 |
| 2011/0081209 A1 * | 4/2011 | Engstrom | B23C 5/06 | 407/40 |
| 2013/0195567 A1 * | 8/2013 | Sunnvius | B23C 5/06 | 407/40 |
| 2014/0072379 A1 * | 3/2014 | Hecht | B23B 29/24 | 407/70 |
| 2014/0205387 A1 * | 7/2014 | Norstedt | B23C 5/2208 | 407/35 |
| 2015/0117969 A1 * | 4/2015 | Brunetto | B23C 5/207 | 407/42 |

* cited by examiner

MILLING TOOL FOR CHIP REMOVING MACHINING

RELATED APPLICATION DATA

This application claims priority under 35 U.S.C. §119 to SE Patent Application No. 1350072-3, filed on Jan. 23, 2013, which the entirety thereof is incorporated herein by reference.

TECHNICAL FIELD

A milling tool having a basic body that is rotatable on a primary center axis includes front and rear ends, between which there is an envelope surface that is rotationally symmetrical in respect of the center axis. A seat is formed in a peripheral transition between the envelope surface and the front end and which houses, on one hand, a semi-permanently fixed shim plate, including an under side pressed against a bottom of the seat, an upper side formed with a support surface, and a side surface extending between the upper and under sides, and on the other hand a replaceable milling insert, which includes an upper side that transforms into a lateral clearance surface via a number of alternately usable cutting edges, and an under side that faces the upper side of the shim plate. The individual cutting edges are equidistantly separated from a secondary center axis that defines the spatial position of the milling insert in the basic body. One of two cutting edges spaced apart farthest axially away from the basic body is located radially outside the other in order to be active during chip removal at the same time as the other is inactive.

Milling tools or milling cutters of the kind in question are suitable for chip removing machining of workpieces of metal, such as steel, cast iron, stainless steel, aluminium, titanium, yellow metals, etc. Also, the tools may be used for milling in composite materials of different types. It should be pointed out that the basic body of the tool usually is manufactured from steel, while the milling inserts are manufactured from a harder material, in particular cemented carbide. Also the shim plates are advantageously manufactured from cemented carbide.

Terminology

Before the embodiment is described in detail, in order to provide conceptual clarity, certain concepts vital to the understanding should be made clear. When a feature is described as "nominal", the same solely relates to an individual milling insert as such, i.e., without coupling to the basic body of the tool, but if the same feature is denominated "functional", the same relates to the assembled state of the tool, i.e., with the milling insert being mounted in a seat in the basic body. Furthermore, the concept "zero point" is used for the point along an active cutting edge that is farthest spaced apart in the axial direction from the basic body of the tool. The attributes "positive" and "negative", respectively, are used by a person skilled in the art in connection with the (nominal or functional) cutting geometry of the milling insert as well as in connection with indication of the spatial position of the mounted milling insert in the basic body of the tool. When the nominal cutting geometry is positive, the clearance surface of the cutting edge forms an acute angle with the upper side of the milling insert. If, however, it is negative, the clearance surface forms an angle of 90° (or more) with the upper side. The spatial position or tipping-in position of the milling insert in the basic body is determined by axial, as well as, radial tipping-in angles, which may be not only positive or negative, but also neutral. If, for instance, an axial tipping-in angle is negative, the plane of the milling insert leans in the upward/forward direction in respect of the direction of rotation of the milling cutter, the secondary center axis of the milling insert leaning upward/rearward in relation to the direction of rotation. If, however, the axial tipping-in angle is positive, the plane of the milling insert leans in the upward/rearward direction. In an analogous way, a radially negative tipping-in angle means that the plane of the milling insert is inclined inward/forward in respect of the direction of rotation, while the radial tipping-in angle is positive if the plane is inclined inward/rearward. Further, the concepts "single-sided" and "double-sided", respectively, milling insert are found. If the milling insert is single-sided, usable cutting edges are found only along an upper side of the milling insert, the nominal cutting geometry usually being positive. Double-sided milling inserts, however, include usable cutting edges both along the upper side and along the under side. The milling insert is then invertible, the nominal cutting geometry thereof most often being negative.

BACKGROUND

In milling cutters having shim plates that are arranged under replaceable milling inserts, the individual shim plate has an important function in preventing—or at least as far as possible counteracting—serious damage in the event of an insert breakdown. Namely, if the co-operating milling insert suddenly would lose its cutting capacity during operation, e.g., as a consequence of fractures or other unexpected faults, the basic body of the milling cutter may dig into the workpiece and cause expensive damage not only to the proper basic body but also to the driving spindle and the parts of the machine tool co-operating with the same. For this reason, the shim plate is usually mounted in such a way that its edge portion, positioned rotationally behind the chip-removing cutting edge of the milling insert, on one hand protrudes radially a distance in relation to the envelope surface of the basic body, but, on the other hand, is located inside the swept area described by the cutting edge during the rotation of the milling cutter. During normal conditions, i.e., as long as the milling insert is in working order, the peripheral edge portion of the shim plate clears the generated surface in the workpiece, at the same time as the envelope surface of the basic body positioned rotationally behind the shim plate is situated radially inside the imaginary circle described by the edge portion of the shim plate. Therefore, if an insert breakdown would occur, the peripheral edge portion of the shim plate can proceed to remove chips from the workpiece without the rotating basic body digging into the workpiece. In other words, the edge portion of the shim plate can passably assume the chip-removing function of the milling insert during the short time that is required to interrupt the milling operation before a more extensive tool and machine breakdown occurs.

Another function of the shim plate is to form a reliable and accurately located long-term bottom support for the milling insert. For this reason, the shim plate is usually manufactured from a material, such as cemented carbide, that is harder than the material of the basic body, which in turn most often consists of steel or aluminium. The shim plate is connected semi-permanently with the basic body, usually via a tubular screw that includes, on one hand, a male thread, which is tightened in a female thread in a hole that mouths in a bottom of the seat of the milling insert, and on the other hand a female thread, in which a male thread of a tightening screw can be tightened to fix the milling insert.

In contrast to the shim plate—which under good conditions can function over the entire service life of the basic body without needing to be replaced—the milling insert is replaced on repeated occasions. In order to avoid a non-uniform wear of the upper side or support surface of the shim plate, this is face ground at the same time as the under side of the milling insert is allowed to protrude radially a short distance (0.1-0.2 mm) outside the radially outer edge portion of the shim plate. In such a way, it is avoided that the great number of milling inserts gradually coin and deform the upper side of the shim plate. Using cemented carbide in the shim plate also entails the advantage that the heat dissipation from the milling insert is accelerated because the coefficient of heat conductivity of the cemented carbide is greater than of the steel.

In such milling operations, where pockets or countersinks are to be created in a surface of a workpiece and where the milling cutter cannot enter the workpiece from the side, so-called ramping has to be resorted to. This means that the milling cutter is subjected to not only a transversal feeding motion, but also an axial, which implies that the milling cutter during its rotation moves obliquely downward in the material. In this connection, there arises—depending on the ramping angle in question—a risk of a phenomenon, which by those skilled in the art is denominated "back-cutting", and which means that the inactive (and maybe unused) cutting edge positioned radially inside the zero point of the milling insert and the clearance surface connected thereto unintentionally contact the material of the workpiece and are worn out by the same. Even if back-cutting at times may give rise to wear damage already to such milling cutters that are equipped with single-sided milling inserts, the risk of damage becomes more frequent and more serious when the milling inserts are double-sided and invertible. In such cases, not only the inactive cutting edge that is situated radially inside the active chip removing cutting edge and in the same upper side as the same, but also an analogous cutting edge along the under side of the milling insert may be spoiled, if the clearance surface of the milling insert interferes with the material of the workpiece, because an axially running surface layer along the clearance surface is scraped off and leaves indentations in the respective cutting edges. If back-cutting is considerable, damage arise not only to the inactive cutting edge and the analogous cutting edge along the under side of the milling insert, but also to the basic body, which leads to the basic body, which is the most expensive part of the tool, becoming unusable.

It should also be mentioned that ramping motions between a milling cutter and a workpiece may be intentional, as well as, unintentional. Intentional ramping takes place with the conscious object of creating a countersink in the surface of the workpiece. Via the machine in question, the milling cutter is then subjected to an axial force component or feeding motion, in addition to the transversal one. In such cases, the milling cutter is most often specially designed for the object, more precisely by being equipped with single-sided milling inserts having a comparatively large functional clearance behind the inactive cutting edge and/or the cutting edge portion that is lying between the active and the inactive cutting edge. In addition, however, also unintentional ramping may be present as a phenomenon, namely if the workpiece is unstably clamped. On that occasion, the proper workpiece may be set in motion, which however are small, but which nonetheless mean that the milling cutter off and on dives down into the surface material.

An aspect of the disclosure is the task to allow ramping operations by such milling tools that are designed with shim plates with the traditional object of preventing damage to the basic body of the tool in the event of insert breakdowns. More precisely, the aspect aims at protecting the milling cutter body and the unused and inactive cutting edges that have not been utilized for chip removal and in such a way guaranteeing an optimum serviceability of the tool in general and of all cutting edges after indexing also in those cases where intentional or unintentional ramping motion arises.

According to the aspect, the above-mentioned object is attained by the shim plate being formed with a protuberance, in which there is included an auxiliary cutting edge that is delimited between a chip surface and a clearance surface and that is located in the area of the inactive cutting edge of the milling insert and projects laterally in relation to the same.

In one embodiment, the auxiliary cutting edge of the shim plate has a positive cutting geometry by the clearance surface thereof forming an acute angle in relation to the upper side of the shim plate, such as this is defined by a flat support surface located on a reference plane. In such a way, a good functional clearance is guaranteed between the auxiliary cutting edge and the machined material surface.

In yet an embodiment, the chip surface of the auxiliary cutting edge may extend from an outer cutting edge line to a ridge having a crest situated on a higher level than the support surface, the ridge, via a declining flank surface, transforming into a countersink having a bottom situated on a level below the support surface. Said ridge forms a protection also for downwardly facing, inactive cutting edges of double-sided milling inserts, more precisely by the chips removed by the auxiliary cutting edge being guided away from the inactive cutting edge that should be protected.

In another embodiment, the chip surface of the auxiliary cutting edge may be cross-sectionally concavely arched. Such a chip surface provides for a quick convolution of the removed chips, something which significantly contributes to guiding away the chips from the milling insert.

Advantageously, the auxiliary cutting edge has a length that amounts to at least ⅛ of the total perimeter of the shim plate. In such a way, it is guaranteed that the free-cutting becomes sufficiently large to protect the inactive cutting edge of the milling insert along the portion thereof positioned farthest axially away from the basic body. In such a way, the inactive cutting edge is protected at least in connection with moderate cutting depths. In order to protect the inactive cutting edge of the milling insert also at greater cutting depths, the length of the auxiliary cutting edge can be increased to approx. ¼ of the perimeter of the shim plate.

In an embodiment preferably intended for contour milling, the milling insert has a round basic shape, the auxiliary cutting edge of the shim plate having a chip surface with a crescent-like contour shape that is determined by an arched cutting edge line. By said contour shape of the auxiliary cutting edge, it is gained that the inactive cutting edge of the milling insert is protected in a reliable way without the protuberance, in which the auxiliary cutting edge is included, needing to be made so large that it disturbs the milling operation.

In yet an embodiment, the milling insert is of a polygonal basic shape and includes straight cutting edges having flat clearance surfaces, the auxiliary cutting edge of the shim plate likewise being straight by being delimited by a flat side surface. In such a way, inactive cutting edges of milling inserts for face milling or end milling can be protected in an effective way before indexing.

By utilizing a shim plate available for traditional objects for protecting the basic body and inactive, unused cutting edges if the milling tool is subjected to (intentional or unintentional) ramping. Usually, shim plates for milling cutters are manufactured of the same or similar hard materials as of the milling insert, in particular cemented carbide. By forming such a cemented carbide plate with an auxiliary cutting edge and locating the same adjacent to the cutting edge of the milling insert inactive for the time being, not only the basic body can generally be protected, but also the cutting edge inactive for the time being in order to be preserved intact for a coming indexing.

BRIEF DESCRIPTION OF THE APPENDED DRAWINGS

DETAILED DESCRIPTION

Figure 1:
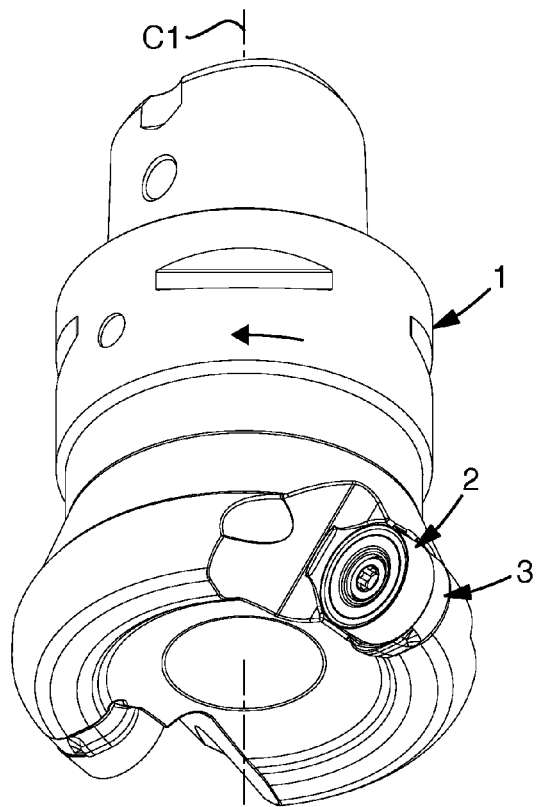
FIG. 1 is a bottom view showing a milling tool according to an embodiment equipped with two milling inserts.

In FIGS. 1-5, a milling tool made is generally shown, which, in addition to a basic body 1 in the form of a milling cutter head, comprises a number of milling inserts 2, each one of which interacts with a shim plate 3. The basic body 1 includes front and rear ends 4, 5, between which a primary center axis C1 extends, on which the basic body is rotatable. Between the front and rear ends 4, 5, an envelope surface in its entirety designated 6 is present and that is generally rotationally symmetrical in relation to the center axis C1.

In the embodiment shown, the tool is exemplified with two milling inserts 2, although the number of milling inserts may vary upward as well as downward. In a peripheral transition between the envelope surface 6 and the front end 4, for each milling insert, a seat in its entirety designated 7 (see FIGS. 4 and 5) is formed, which may house not only the milling insert 2 but also the shim plate 3. In the individual seat 7, a flat bottom surface 8 is included. In a traditional way, the shim plate 3 is semi-permanently fixed in the seat and pressed against the bottom surface 8. In the example, said fixation is provided for by a tubular screw 9 having a male thread, which can be tightened in a female thread included in a hole 10 that mouths in the bottom surface 8 of the seat. The milling insert 2, which requires frequent replacements, is in turn clamped against the shim plate by means of a tightening device 11 in the form of a screw having a male thread, which can be tightened in a female thread in the tubular screw 9. For allowing passage of the screws 9 and 11, the shim plate and the milling insert, respectively, are formed with through holes 12, 13.

A secondary center axis, viz. for the milling insert 2, is designated C2. Solitary center axes of the hole 12 in the shim plate 3 and the hole 10 are designated C3 and C4, respectively. In the area in front of each seat (and milling insert), also a traditional chip channel (lacks reference designation) is present.

Figure 2:
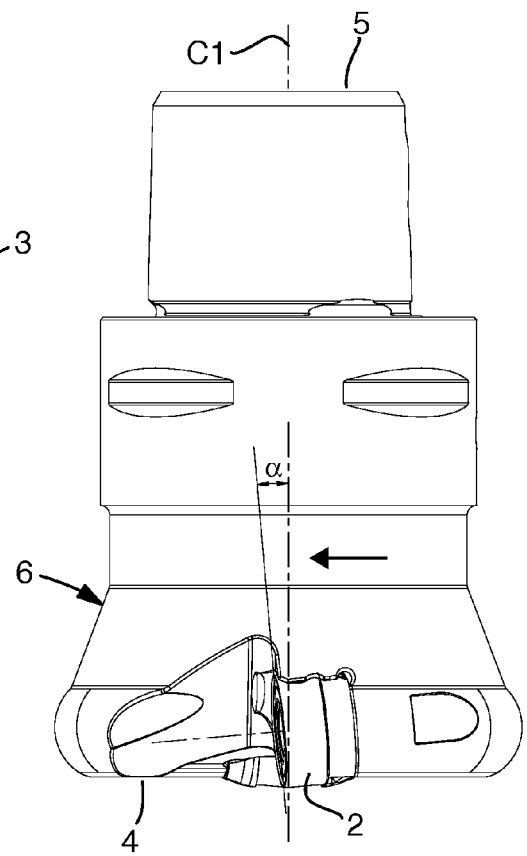
FIG. 2 is a side view of the tool of FIG. 1.
Figure 3:
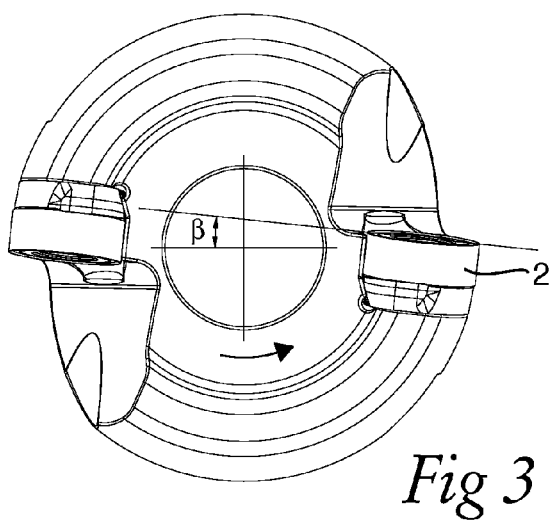
FIG. 3 is an end view from below of the tool.
Figure 4:
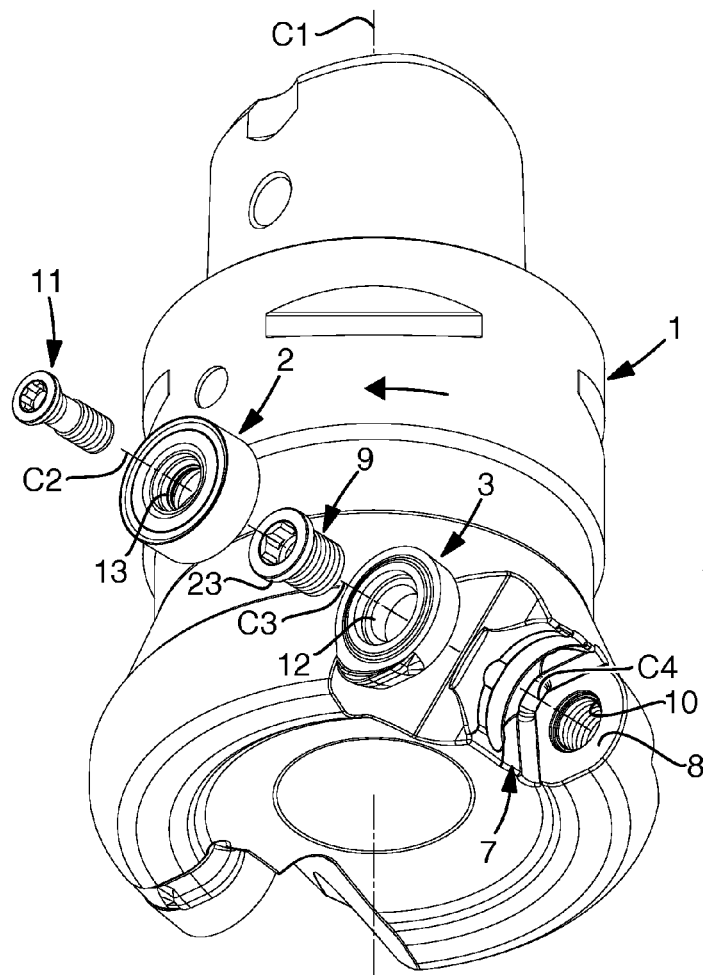
FIG. 4 is an enlarged, perspective exploded view showing, on one hand, a seat included in the basic body of the tool, and on the other hand a milling insert exploded away and a shim plate interacting with the same.
Figure 5:
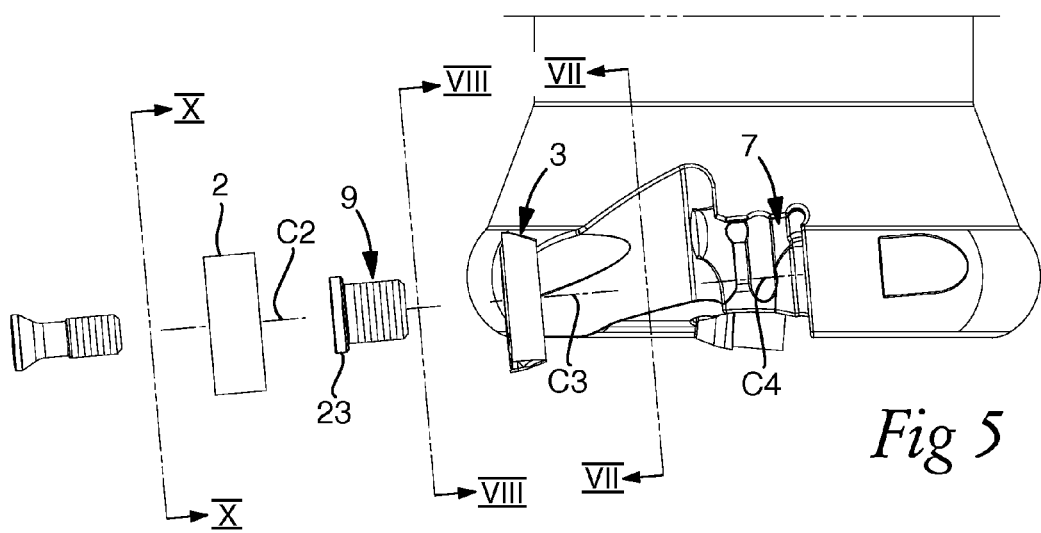
FIG. 5 is a further exploded view showing the basic body, as well as the milling insert and the shim plate as viewed from the side.

In FIG. 2, α designates an axial tipping-in angle of the milling insert 2, while β in FIG. 3 designates the radial tipping-in angle of the same. Because the exemplified milling inserts are double-sided and invertible, the axial tipping-in angle α as well as the radial one β are in this case negative. In the example, α amounts to −5° and β to −6°. By locating the milling insert in a spatial position, in which the axial tipping-in angle as well as the radial are negative, the milling insert obtains a good functional clearance along its active, chip removing cutting edge.

Figure 6:
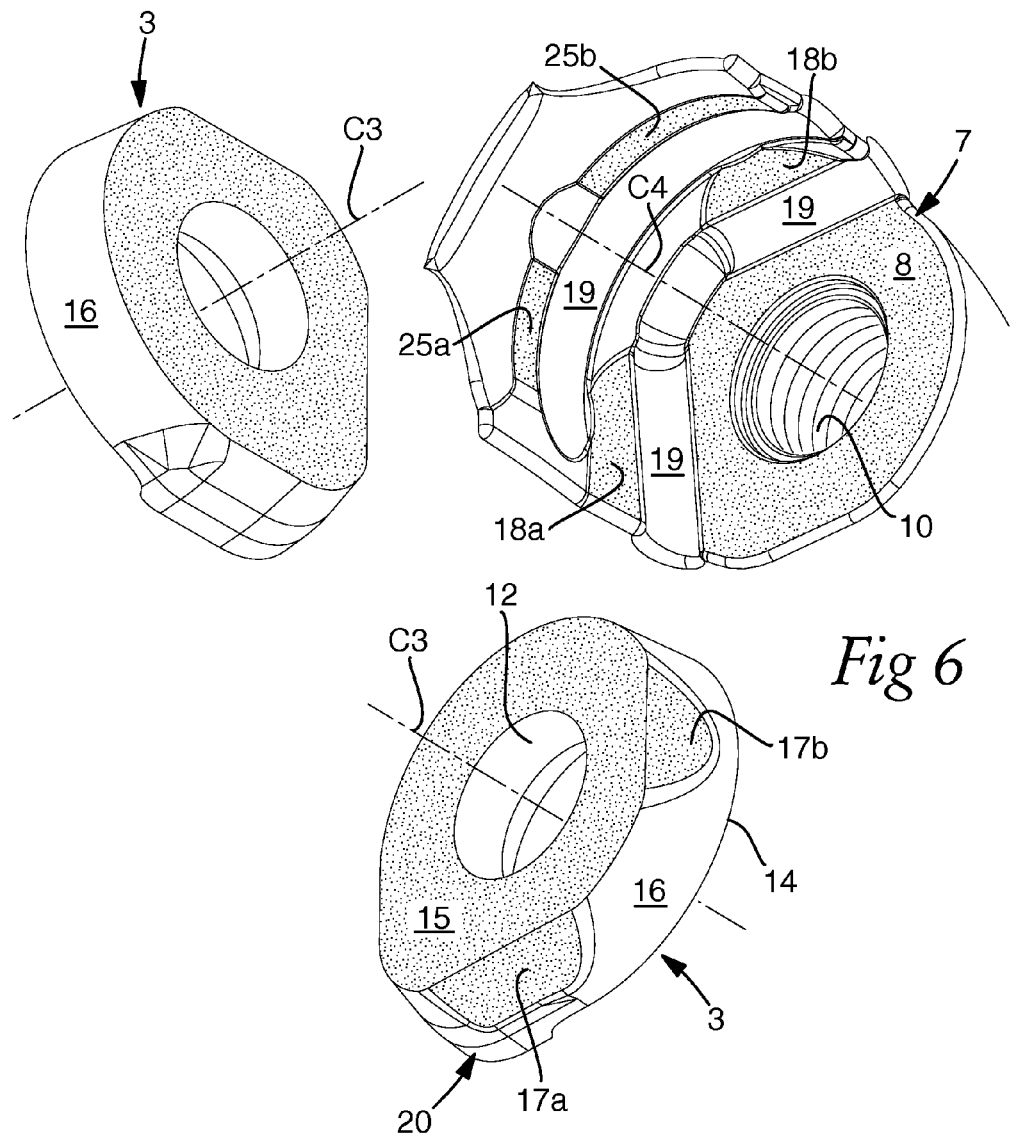
FIG. 6 is a further enlarged, perspective exploded view showing, on one hand, the individual seat, and on the other hand a shim plate mountable in the same as viewed from two different directions.
Figure 7:
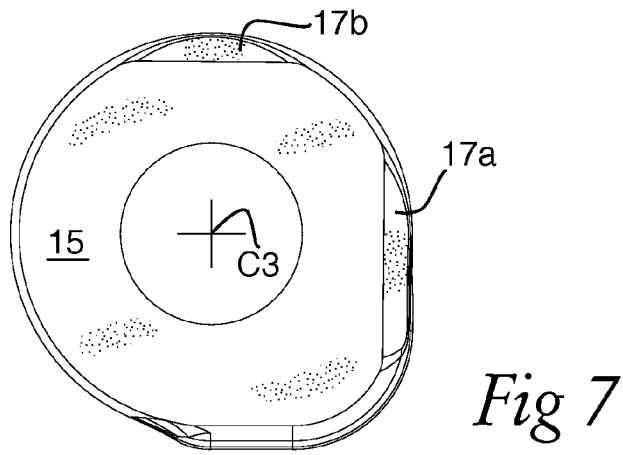
FIG. 7 is a planar view from below of the shim plate.
Figure 8:
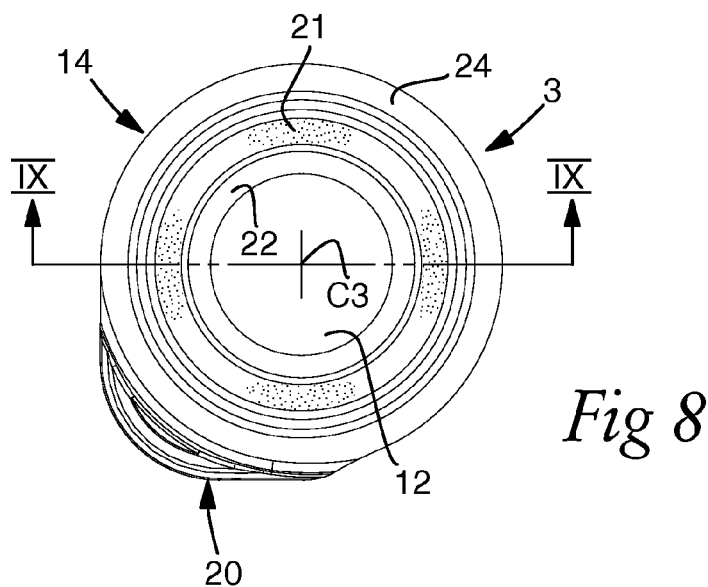
FIG. 8 is a planar view from above of the same.

Reference is now made to FIGS. 6-8, which illustrate the design of the seat 7 and the shim plate 3 mountable at the bottom of the same. The latter includes an upper side generally designated 14 (see FIG. 8), an under side 15, and a side surface 16 extending between the same. The contour shape of the shim plate follows to a major extent the round shape of the milling insert, more precisely by the fact that the side surface 16 is round. However, two flat part surfaces 17a, 17b are formed in the same, which are running at a right angle in relation to each other, as seen in FIG. 7. These surfaces serve as side contact surfaces, which are pressable against two side support surfaces 18a, 18b included in the seat 7 and running perpendicular to each other. As seen in FIG. 6, the side support surfaces 18a, 18b are separated level-wise from the bottom surface 8 via concave clearance surfaces 19. When the shim plate is fixed by means of the tubular screw 9 (see FIG. 5), the side contact surfaces 17a, 17b are pressed in close contact against the side support surfaces 18a, 18b, whereby rotation of the shim plate is prevented.

In the shim plate 3, there is also included a protuberance 20 projecting in relation to the rest of the side surface 16, which protuberance characterizes the invention and will be described later.

Figure 9:
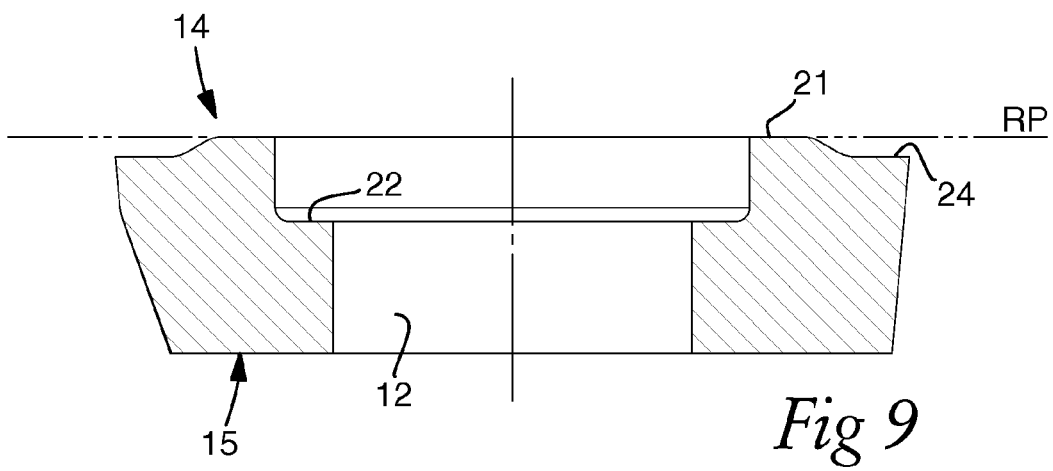
FIG. 9 is an enlarged cross section taken along line IX-IX of FIG. 8.

In the upper side 14 (see FIG. 8), a plurality of ring-shaped and concentric part surfaces are included, the one of which designated 21 forms a flat support surface, against which an under side of the milling insert can abut. As seen in FIG. 9, the support surface 21 is situated on a reference plane RP that defines the generally flat shape of the upper side. A radially inner ring surface 22 serves as shoulder surface for a head 23 included in the tubular screw 9. A peripheral part surface 24 is countersunk in relation to the support surface 21.

Concerning the seat 7, it should be pointed out that the same also includes two side support surfaces 25a, 25b for the milling insert 2. These are arched to follow the round shape of the milling insert and separated level-wise from the side support surfaces 18a, 18b of the shim plate via a further, concave clearance surface 19.

Figure 10:
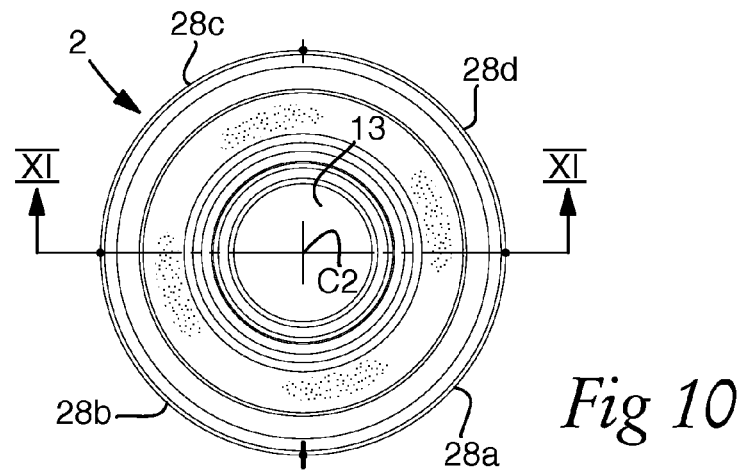
FIG. 10 is a planar view of the individual milling insert (irrespective of whether this is regarded from above or from below).
Figure 11:
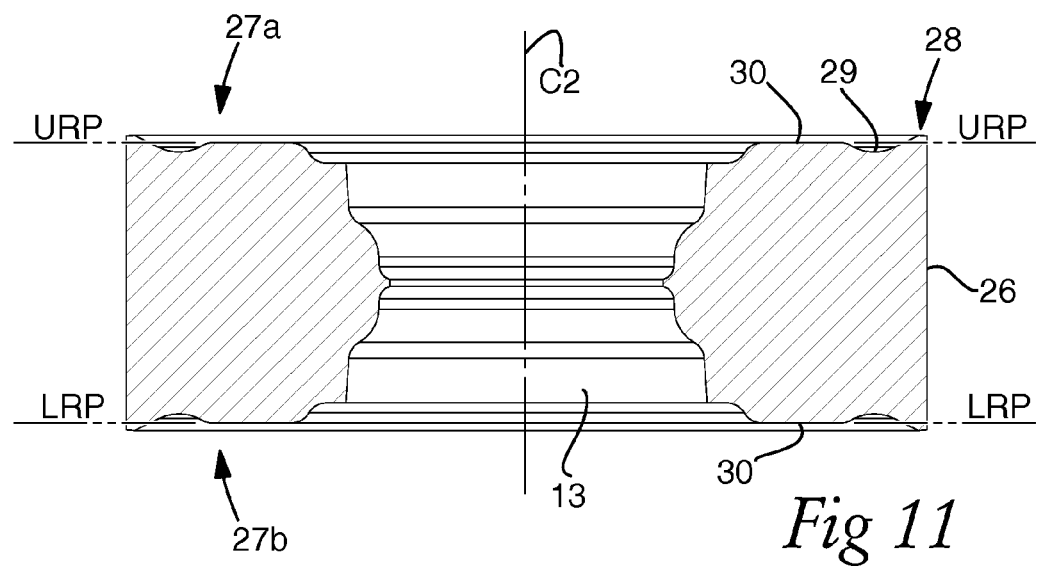
FIG. 11 is an enlarged cross section taken along line XI-XI of FIG. 10.
Figure 12:
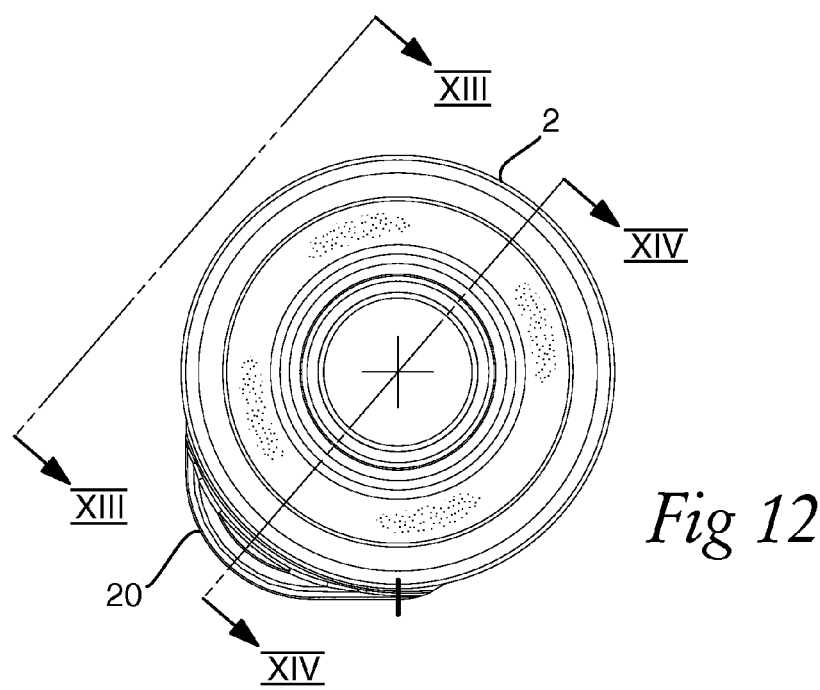
FIG. 12 is a planar view from above of a milling insert applied to a shim plate.
Figure 13:
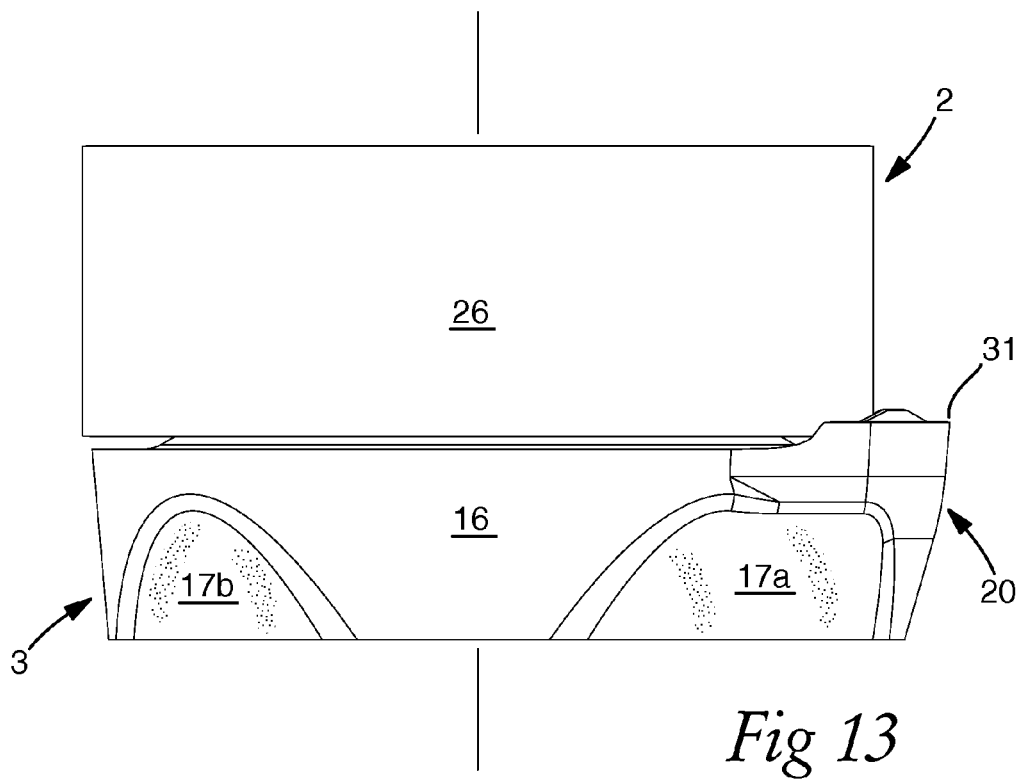
FIG. 13 is an enlarged side view taken along line XIII-XIII of FIG. 12.
Figure 14:
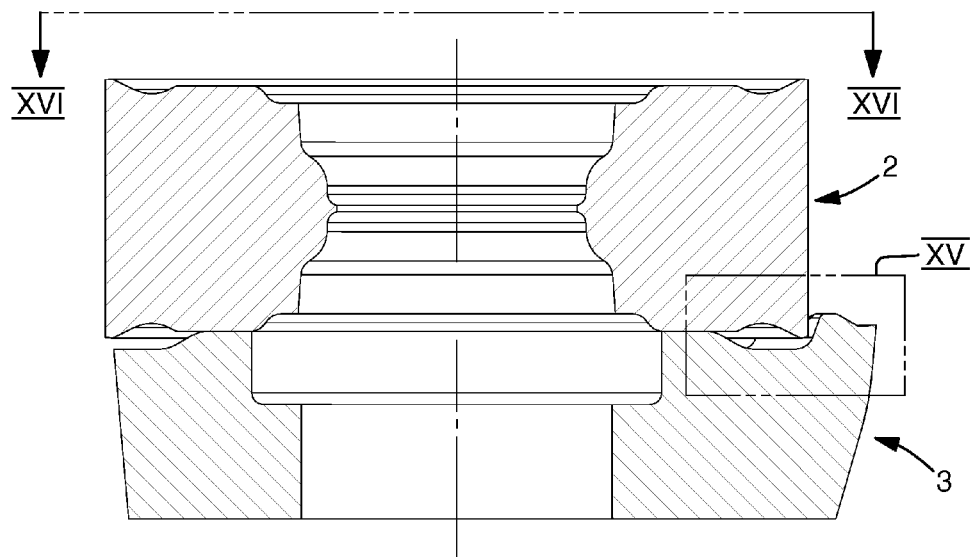
FIG. 14 is an enlarged cross section taken along line XIV-XIV of FIG. 12.

Reference is now made to FIGS. 10 and 11, which illustrate the design of the exemplified milling insert. As previously has been mentioned, the milling insert 2 is round and double-sided as well as has a negative cutting geometry. Thus, the same is formed with two identical and mutually parallel chip faces, between which an endless, cylindrical clearance surface 26 extends. In order to separate the two chip faces in a functional respect, the same are henceforth denominated upper side 27a and under side 27b, respectively. Each chip face includes a peripheral, endless edge or cutting edge 28, which is delimited between a cross-sectionally arched chip surface 29 and the clearance surface 26. Inside the chip surface 29, there is a flat, ring-shaped contact surface 30, which is pressable against the upper, flat support surface 21 of the shim plate 3. In the mounted state of the milling insert, the upper contact surface 30 is situated on an upper reference plane designated URP, while the corresponding contact surface included in the under side 27b of the milling insert is located on a lower reference plane LRP. As clearly seen in FIG. 11, the individual edge 28 is situated on a higher level than the support surface 30 being inside, i.e., the last-mentioned one is countersunk in relation to the first-mentioned one.

If the milling insert should be used for cutting depths that approach half the diameter of the milling insert, four quarter circle-shaped portions of the edge or cutting edge 28 may alternately be used for chip removal. Thus, along each chip face, four tangentially spaced-apart cutting edges 28a, 28b, 28c, and 28d are available. Of the four cutting edges distinguished by means of clearly marked points, the cutting edge 28a is assumed to be chip removing, while the other cutting edges are inactive. All four cutting edges 28a, 28b, 28c, 28d are equidistantly separated in the radial direction from the secondary center axis C2, which simultaneously forms center axis of the hole 13. In this connection, it should be pointed out that the milling insert may be fixed in another way than by means of a screw, and therefore the same does not necessarily have to include a central hole.

Figure 15:
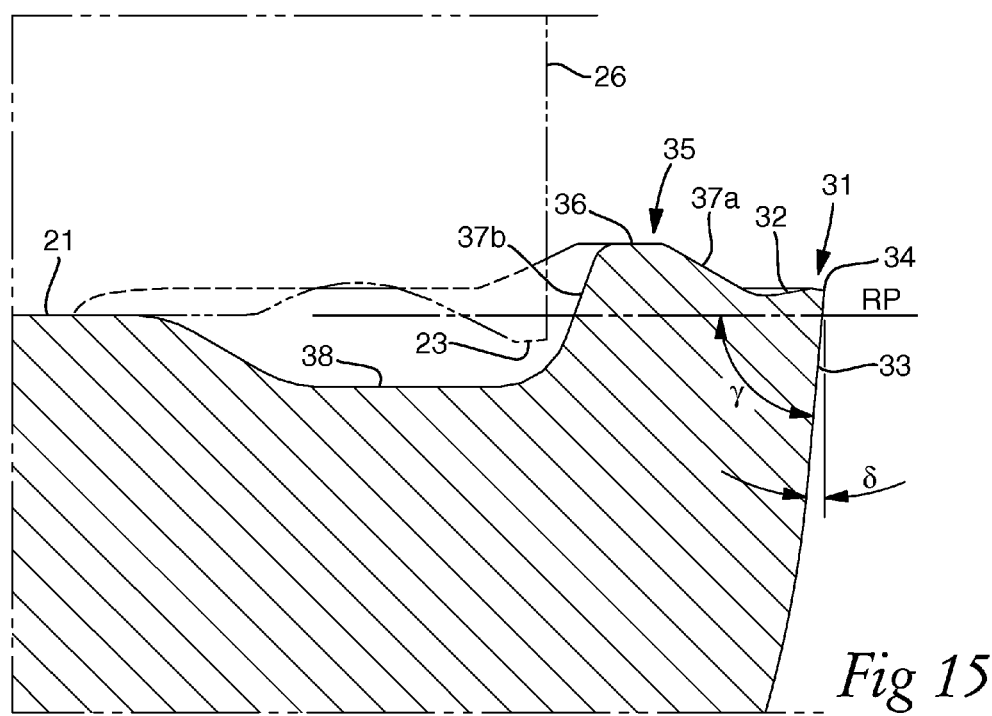
FIG. 15 is a further enlarged section XV in FIG. 14.
Figure 16:
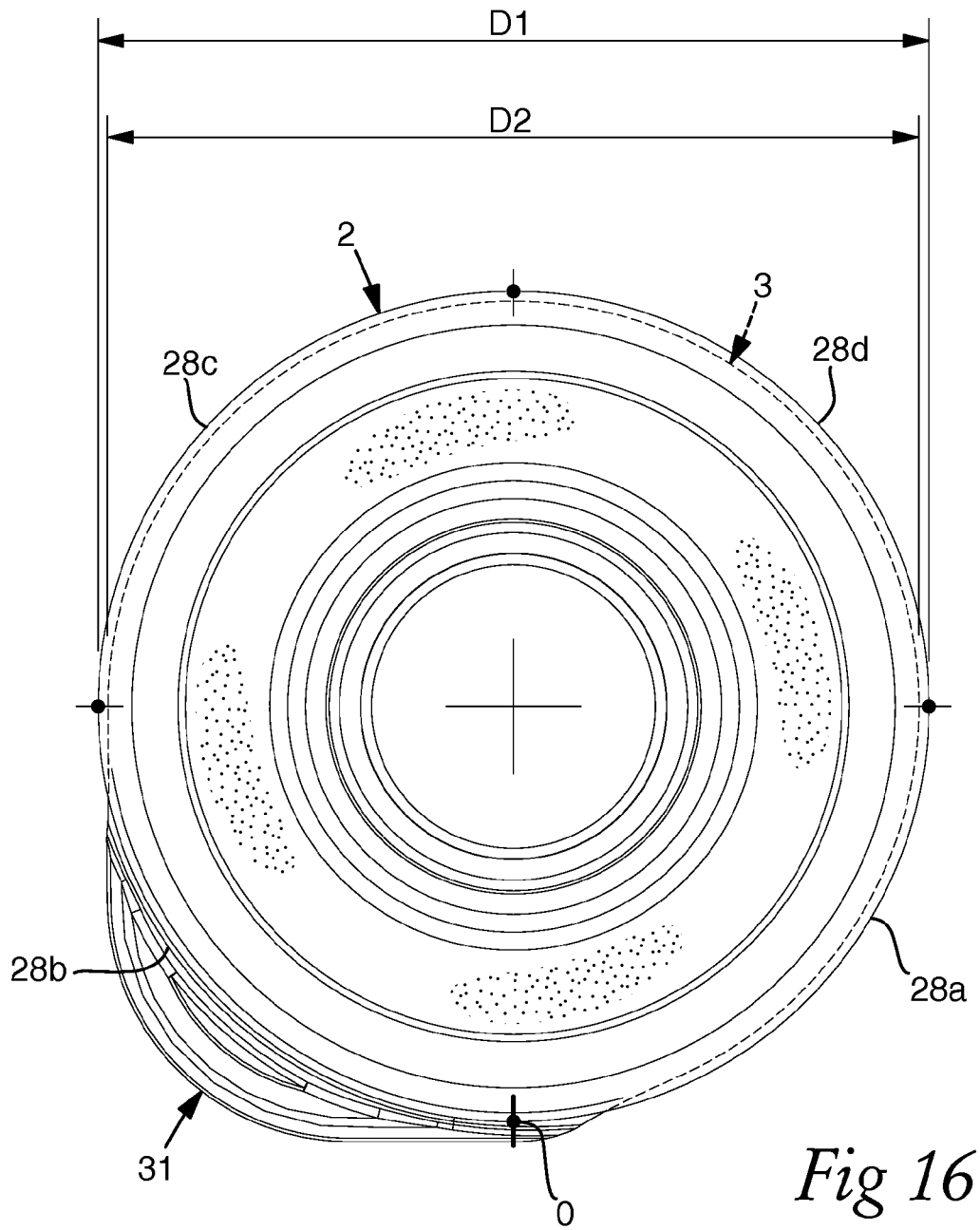
FIG. 16 is a planar view taken along line XVI-XVI of FIG. 14 (see also FIG. 8), the milling insert and the shim plate being assumed to lie in the plane of the drawing.
Figure 18:
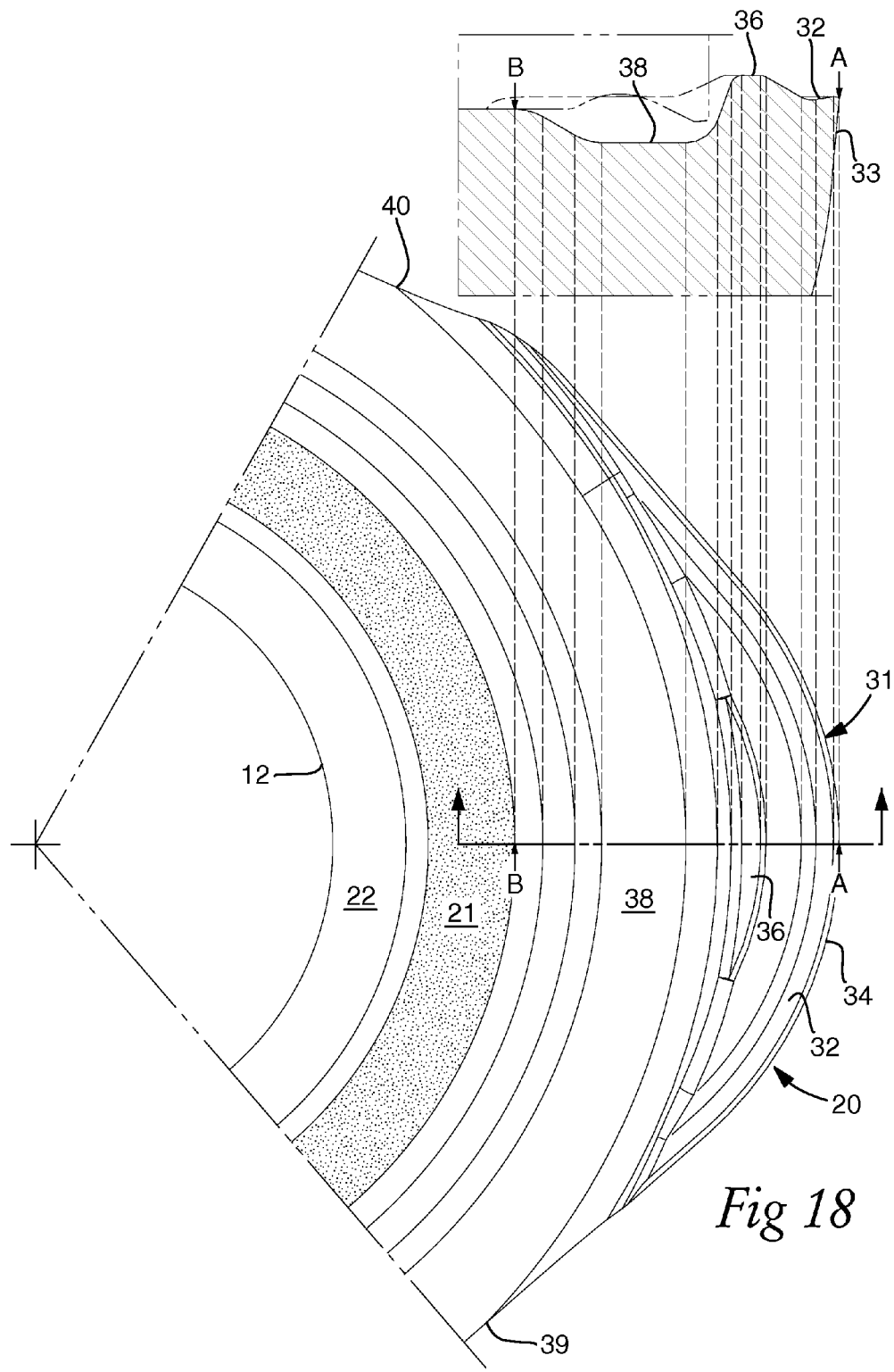
FIG. 18 is a schematic exploded view that illustrates the design of a protuberance included in the shim plate shown in planar view from above, as well as in cross-section.

Reference is now made to FIGS. 12-16, which show the milling insert 2 placed on top of the shim plate 3. In this state, the center axes C2, C3 and C4 are shown in line with each other. As seen in FIG. 16, in which the contour shape of the shim plate 3 is shown by a dashed line, the diameter D1 of the milling insert is somewhat greater than the diameter D2 of the shim plate. In other words, the milling insert 2 corbels out radially in relation to the round side surface 16 of the shim plate 3. However, this only extends along approx. ¾ of the perimeter of the shim plate, while approx. ¼ is occupied by the protuberance 20, which will be described in more detail below with reference also to FIG. 18.

Protuberance 20 (see FIG. 15) is formed with an auxiliary cutting edge in its entirety designated 31, which is delimited between a chip surface 32 and a clearance surface 33 that meet each other along a cutting edge line 34. In the shown, preferred embodiment, the auxiliary cutting edge 31 has a positive cutting geometry by the fact that the clearance surface 33 forms an acute angle γ with the upper side, such as this is defined by the reference plane RP. In the example, γ amounts to approx. 88°, and hence it follows that the nominal clearance angle δ amounts to approx. 2°. In this connection, it should be pointed out that the functional clearance angle becomes considerably greater as a consequence of the negative axial tipping-in angle α of the milling insert.

With reference to FIG. 16, it should be pointed out that the cutting edge 28a is the active chip removing cutting edge of the milling insert during operation. This extends radially outward/upward from the zero point $\underline{0}$ that is spaced apart farthest axially away from the basic body 1. The cutting edge 28b positioned radially inside the zero point $\underline{0}$ is, however, inactive. The primary function of the auxiliary cutting edge 31 included in the protuberance 20 is to protect the inactive cutting edge 28b from damage in connection with back-cutting. Just for this purpose, it is sufficient that the auxiliary cutting edge 31 projects radially in relation to the clearance surface 26 of the milling insert 2. However, in order to also protect the inactive cutting edges of the milling insert 2, which face downward toward the shim plate 3, the protuberance includes a protecting ridge 35. As most clearly seen in FIG. 15, the chip surface 32 of the auxiliary cutting edge extends from the radially outer cutting edge line 34 to a crest 36 on the ridge 35 via a slope surface 37a. From the crest 36, the ridge 35 transforms via a relatively steep declining flank surface 37b into a chute or countersink 38 in the upper side of the shim plate. In relation to the reference plane RP positioned flush with the support surface 21, not only the cutting edge line 34 of the auxiliary cutting edge 31, but also the crest 36 of the ridge, are elevated. More precisely, the cutting edge line is situated on a level that is somewhat lower than the level of the ridge crest 36 above the reference plane. In FIG. 15, it should furthermore be noted that the flank surface 37b is situated radially outside the clearance surface 26 of the milling insert 2. Furthermore, the bottom 38 of the chute is situated below the reference plane RP as well as the downwardly facing cutting edge 23 of the milling insert. Chips, which are removed from the workpiece by the auxiliary cutting edge 31, will, via the slope surface 37a of the ridge 35, be directed upward toward the clearance surface 26 of the milling insert without impinging on the downwardly facing and inactive cutting edge that is situated below the likewise inactive cutting edge 28b.

Although the chip surface 32 of the auxiliary cutting edge 31 per se could be flat, in the example shown, the same is concavely arched, as viewed in a cross-section.

The length of the auxiliary cutting edge 31 such as this is determined by the extension of the cutting edge line 34 between two end points 39, 40 (see FIG. 18) should amount to at least 1/8 of the total perimeter of the shim plate. On the other hand, the same should not essentially exceed 1/4 of the perimeter.

In the example shown, when the shape of the milling insert basic is round, the auxiliary cutting edge has a crescent-like contour shape that is defined by the cutting edge line 34 being arched.

Figure 17:
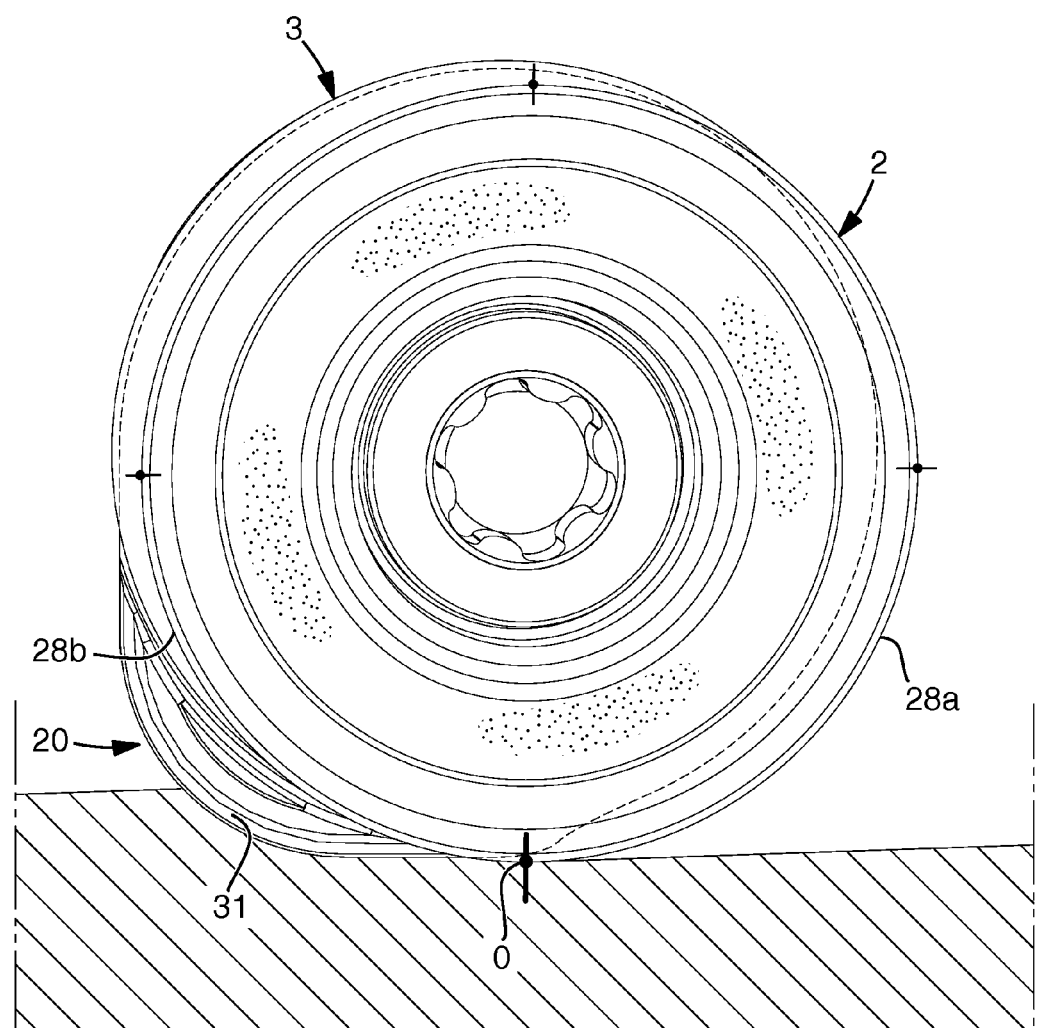
FIG. 17 is a view corresponding to FIG. 16 that illustrates the milling insert and the shim plate in the tipped-in spatial position in the basic body, these being shown during the milling of a work piece.

Referring to FIGS. 19-24, the individual milling insert, as well as, the co-operating shim plate are shown in their tipped-in spatial positions in the basic body in FIG. 17. It should be repeated that the radially outer one of the two functionally lower (i.e., spaced apart farthest axially away from the basic body) cutting edges, viz. the cutting edge 28a, is actively chip removing at the same time as the radially inner one 28b is inactive and should be protected. The auxiliary cutting edge 31 is located adjacent to the cutting edge 28b of the milling insert 2.

Figure 19:
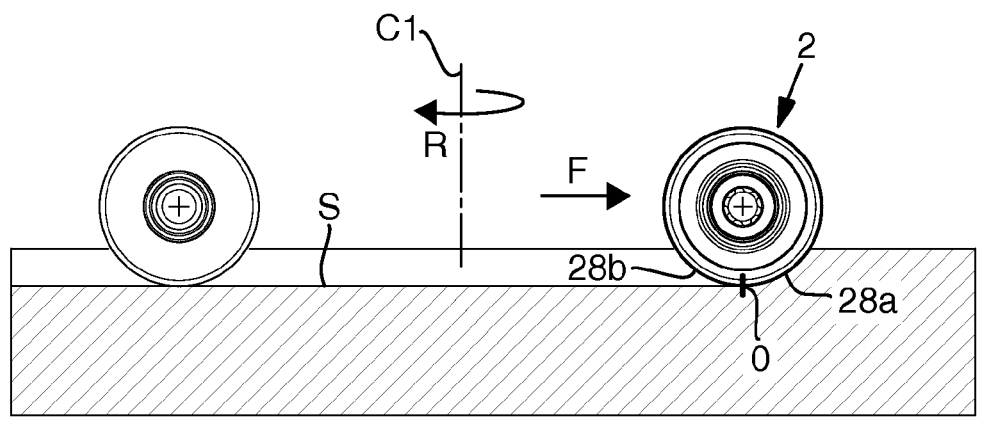
FIGS. 19-20 are schematic pictures showing two milling inserts included in a milling cutter during trivial face milling of a workpiece, the right milling insert being regarded from the front in the direction of rotation, while the left being regarded from behind.
Figure 20:
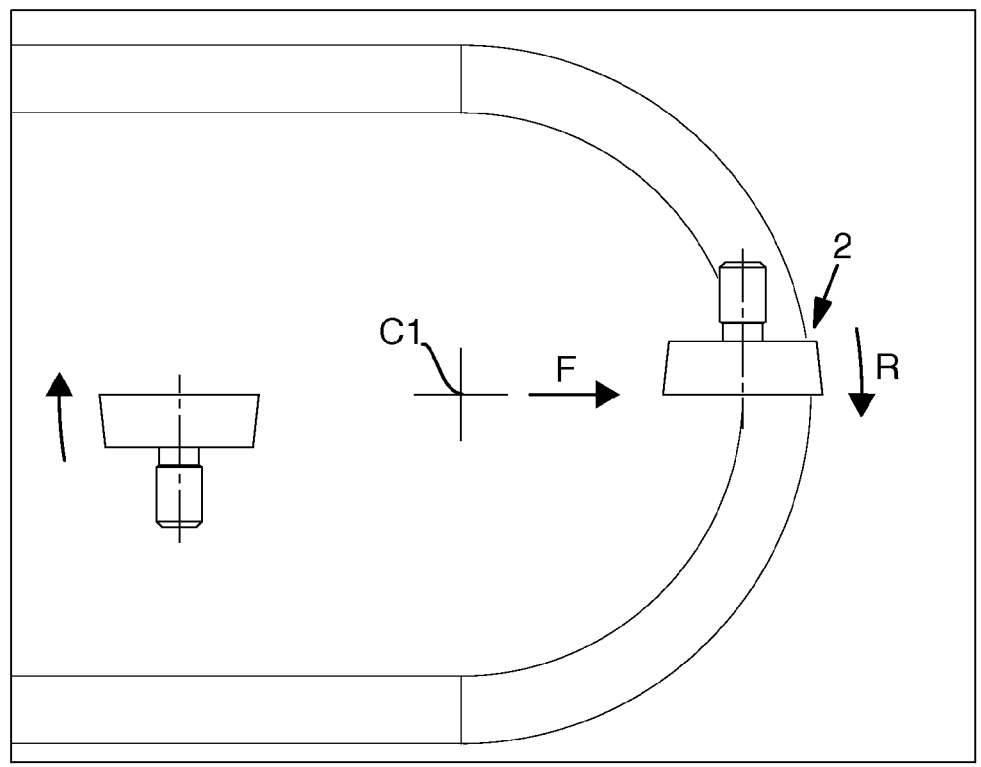
Figure 21:
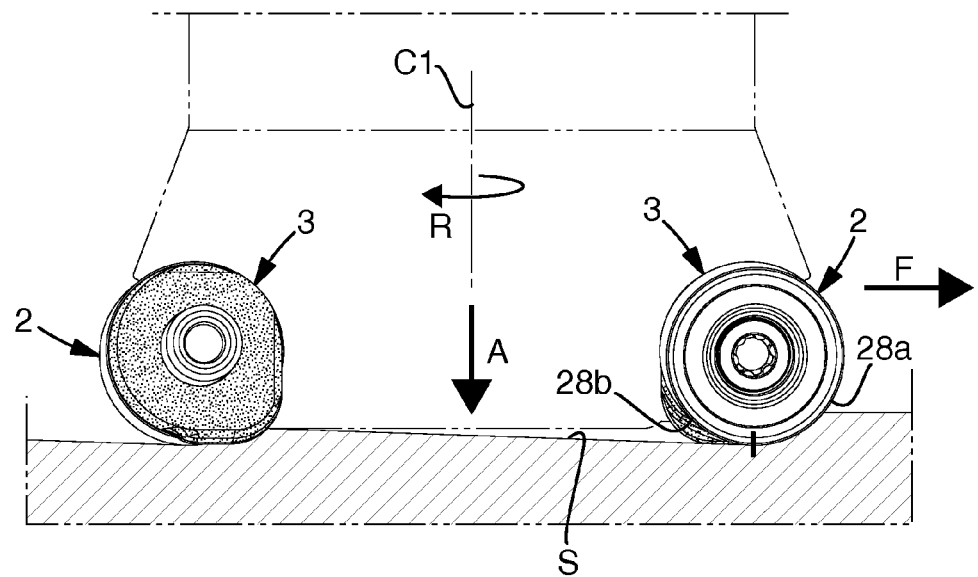
FIGS. 21-22 are two schematic pictures showing the function of the milling tool according to the invention during ramping, the two milling inserts being shown as viewed from a near side relative to the plane of the drawing.
Figure 22:
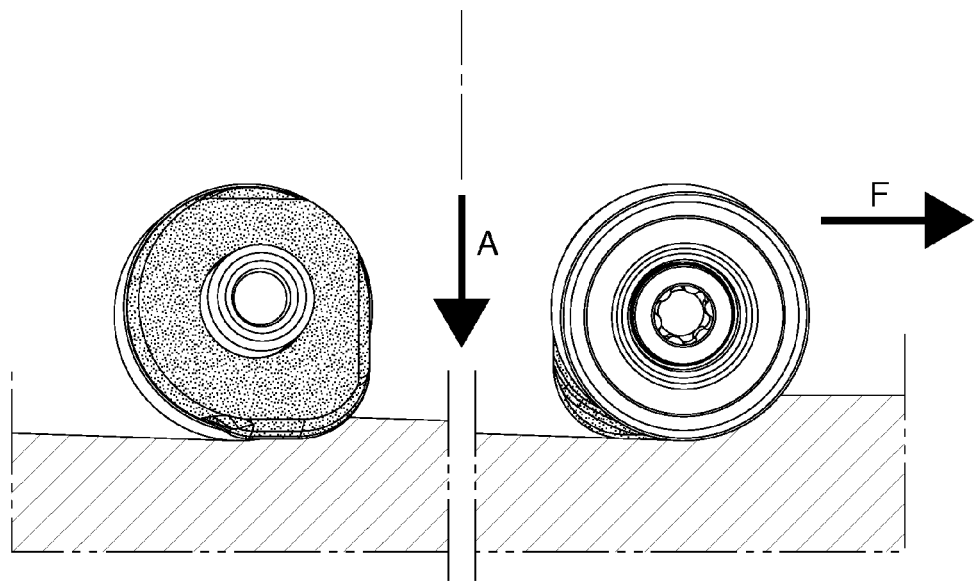
Figure 23:
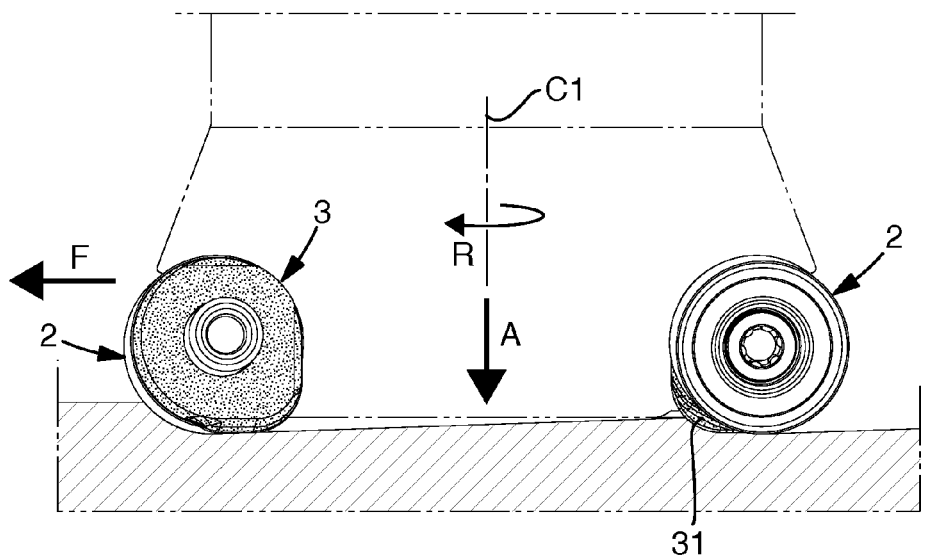
FIGS. 23-24 illustrate the milling inserts of FIGS. 21-22, as viewed from a far side.
Figure 24:
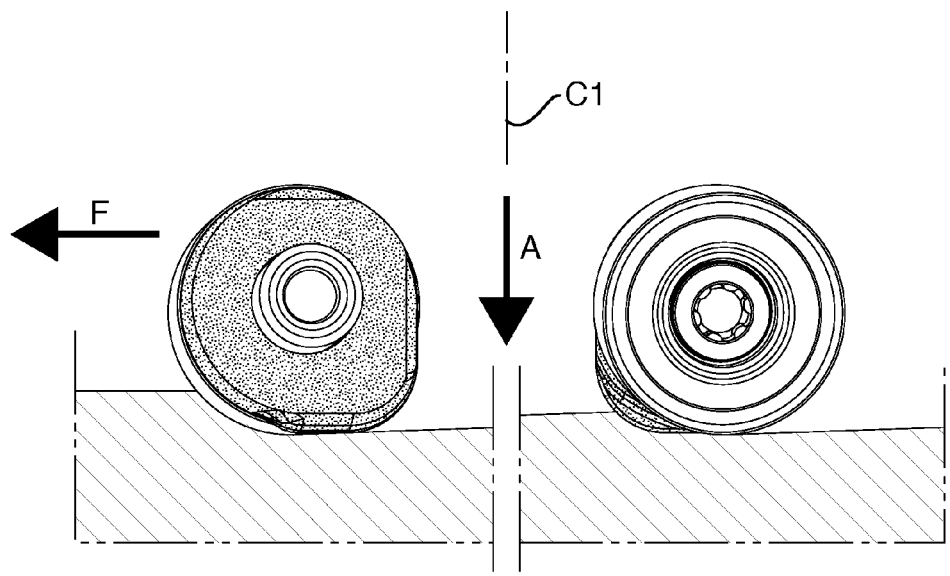
Figure 25:
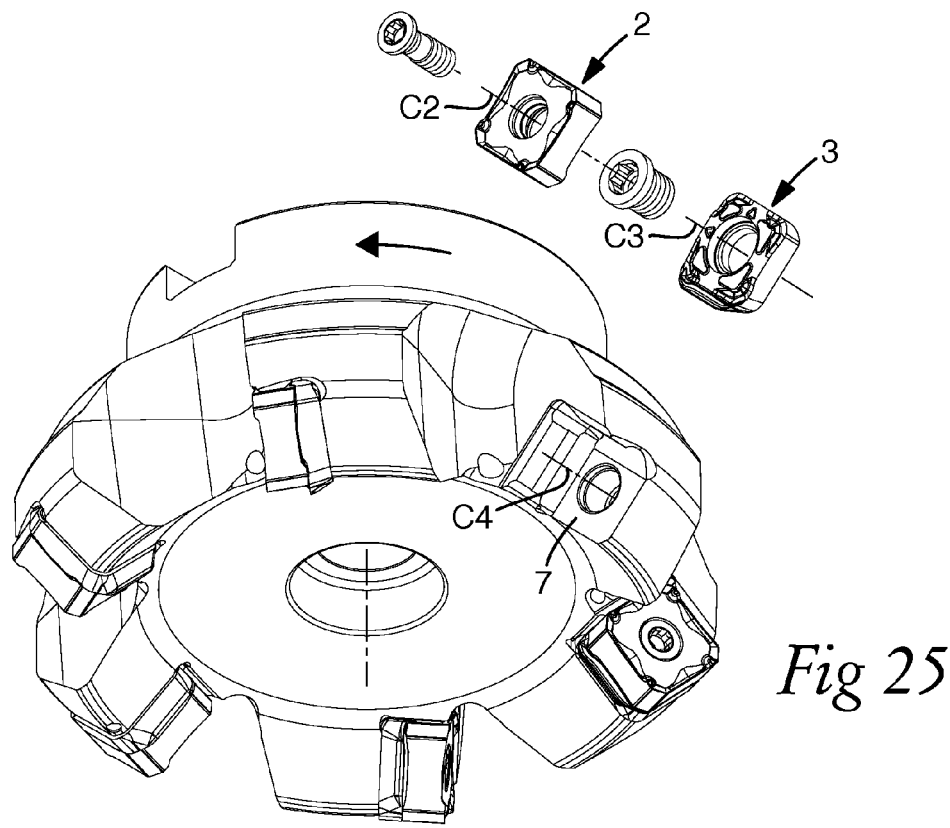
FIG. 25 is a perspective exploded view showing an alternative embodiment of the milling tool.
Figure 26:
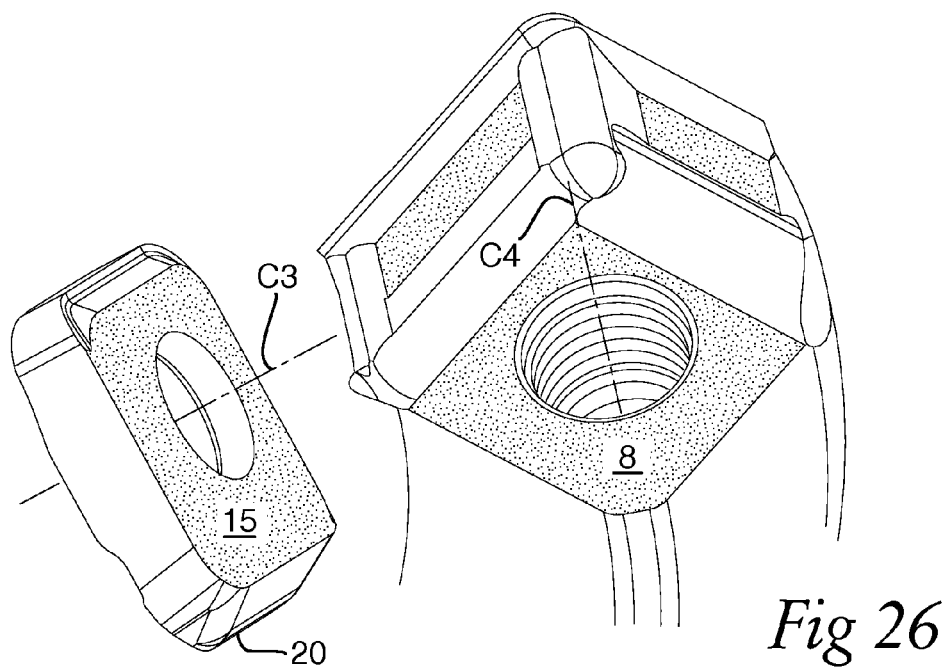
FIG. 26 is an enlarged perspective view of a seat included in the basic body of the tool according to FIG. 25, as well as, a shim plate mountable in the same.
Figure 27:
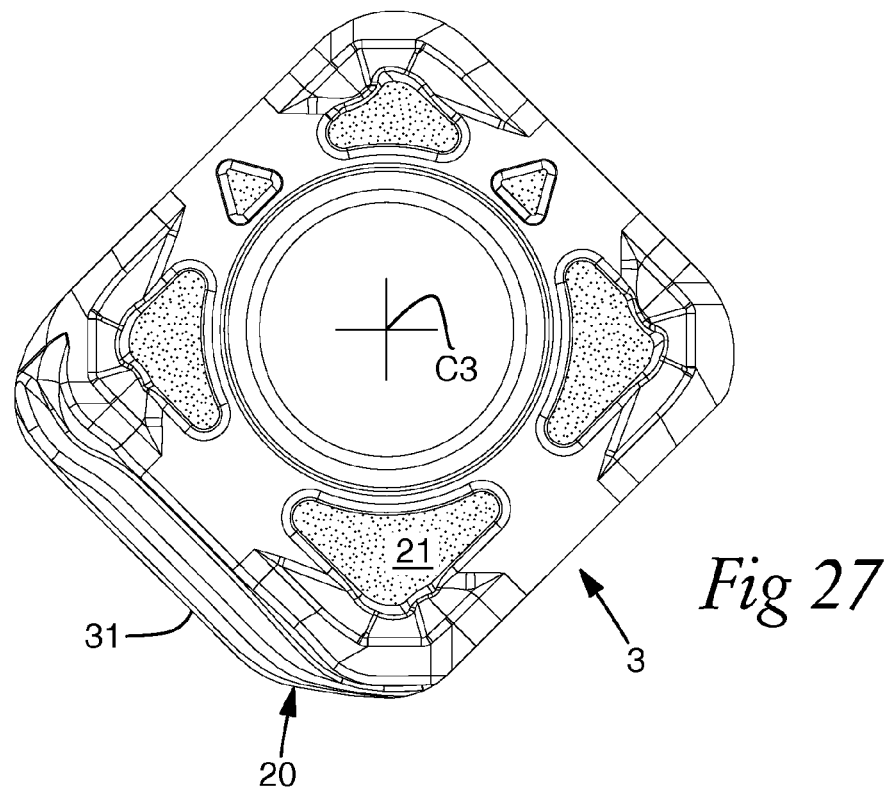
FIG. 27 is an enlarged planar view of the shim plate according to FIG. 26.
Figure 28:
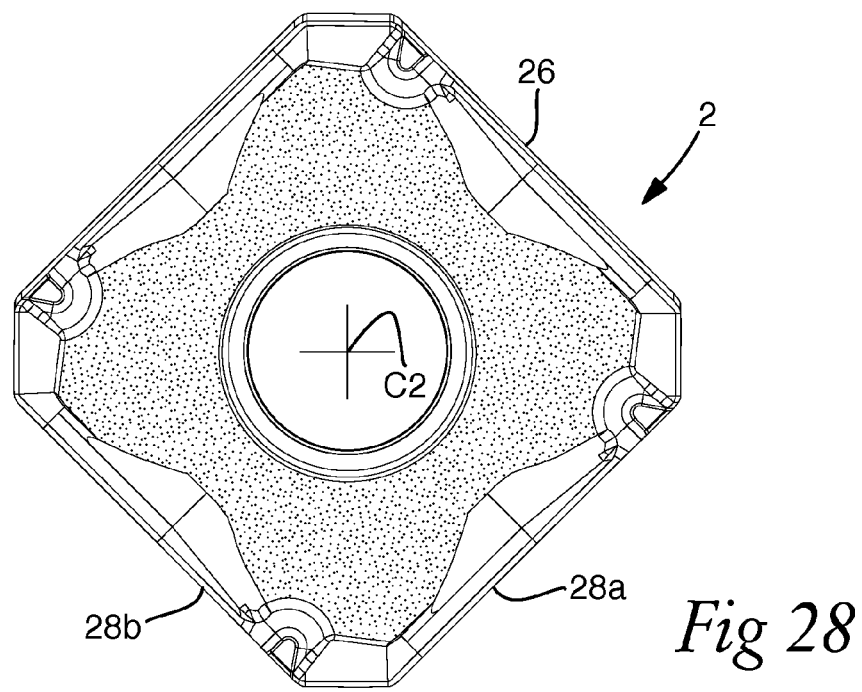
FIG. 28 is a planar view of a milling insert included in the same tool.

In FIGS. 19 and 20, a round milling insert 2 is schematically shown during the rough milling of a workpiece, i.e., milling with the purpose of removing a flat surface layer from the workpiece. In this case, in addition to customary rotation R, the milling cutter is subjected to a transversal feeding motion F, which in the workpiece generates a flat surface S that extends perpendicular to the center axis C1. This takes place by means of the chip removing cutting edge 28a, which extends radially outward/upward from the zero point 0. The cutting edge 28b being inside is, however, inactive. When the milling insert has covered half a revolution and reached the left position according to FIG. 19, the radially outer cutting edge 28a as well as the radially inner cutting edge 28b clear the generated, flat surface S.

It is different when a milling cutter is used for ramping, as shown in FIGS. 21-24. More precisely, here a milling cutter made in accordance with the invention is illustrated, i.e., a milling cutter the individual shim plate of which has an auxiliary cutting edge of the type described above. In this case, the milling cutter is subjected to not only a transversal feeding motion F, but also an axial one A. In such a way, the milling cutter will also move downward in the surface of the workpiece, whereby the generated surface S will be tilted in relation to a plane perpendicular to the center axis C1 of the basic body, more precisely at a moderate angle (ramping angle). During half the revolution that a milling insert without any cutting shim plate rotates from the right position in FIG. 21 to the left, the material (e.g. steel) will therefore—depending on the ramping angle—commence climbing up along the radially inner cutting edge 28b and/or come in contact with the clearance surface 26 adjacent to the same. For this reason, not only the inactive cutting edge 28b that is situated in the same upper side as the active cutting edge 28a, but also the cutting edge facing the shim plate in the same sector may risk damage. If namely a surface portion along the clearance surface 26 is worn, by chafing against the material of the workpiece, said surface damage may propagate also to the cutting edge facing the shim plate and destroy its micro geometry.

By the existence of the protuberance 20 formed in the shim plate and the auxiliary cutting edge 31 included in the same, however, during the ramping, the auxiliary cutting edge will cut away a cross-sectionally crescent-shaped surface portion, which guarantees that the subsequent, inactive cutting edges clear the material surface when the same pass the cut out swept area portion.

Reference is now made to FIGS. 25-28, which illustrate an alternative embodiment, in which the milling inserts 2 have a polygonal basic shape instead of round. More precisely, the milling insert is double-sided and quadratic, i.e., includes four usable cutting edges along each chip face. As a consequence of the quadratic shape of the milling insert, the cutting edges are essentially straight so far that the clearance surfaces 26 are flat.

The contour shape of the shim plate 3 follows the contour shape of the milling insert 2 so far that the plate includes side surfaces that form a mutual angle of 90°. Along one of the four sides of the plate, a protuberance 20 is formed, which projects laterally in relation to the milling insert being above, and which in the previously described way includes an auxiliary cutting edge 31. This fulfils the same function as the crescent-shaped cutting edge for the round milling inserts, viz. to provide a clearance between a swept area and the inactive cutting edges during the ramping. In this case, accordingly the invention is applied to a milling cutter that is suitable for face milling or end milling.

A primary advantage is that milling cutters having shim plates of the described kind allow at least moderate ramping motions without the inactive cutting edges intended for later forward indexing being damaged.

Although the above has been exemplified in connection with double-sided milling inserts, the same may also be applied to such milling cutters that are equipped with single-sided milling inserts. The essential for such an application is that the auxiliary cutting edge of the shim plate projects laterally from the inactive cutting edge of the milling insert, when the milling insert is regarded in plane elevation along the center axis C2.

What is claimed is:
1. A milling tool, comprising:
a basic body rotatable on a primary center axis including front and rear ends, between which there is disposed an envelope surface that is rotationally symmetrical in respect to the center axis;
a seat formed in a peripheral transition surface extending between the envelope surface and the front end;
a removably fixed shim plate housed in the seat, the shim plate including an under side arranged to press against a bottom of the seat, an upper side formed with a support surface, and a side surface extending between the upper and under sides; and
a replaceable milling insert including a secondary center axis, an upper side that joins a lateral clearance surface via at least two alternately usable individual cutting edges, and an under side that faces the upper side of the shim plate, the individual cutting edges being equidistantly separated from the secondary center axis that defines a centering position of the milling insert in the basic body, and one of the at least two cutting edges spaced apart farthest axially away from the basic body being located radially outside the other cutting edge in order to be active during chip removal at the same time the one cutting edge is inactive, wherein the shim plate includes a protuberance having an auxiliary cutting edge that is delimited between a chip surface and a clearance surface, the auxiliary cutting edge projecting laterally from the inactive cutting edge.
2. A milling tool according to claim 1, wherein the auxiliary cutting edge of the shim plate has a positive cutting geometry by the clearance surface thereof forming an acute angle in relation to the upper side and defined by a reference plane along the support surface.

3. A milling tool according to claim 1, wherein the chip surface of the auxiliary cutting edge extends from an outer cutting edge line to a ridge having a crest situated on a higher level than the support surface, the ridge, via a declining flank surface, transforming into a countersink having a bottom.

4. A milling tool according to claim 3, wherein the bottom of the countersink is situated on a level below the support surface.

5. A milling tool according to claim 1, wherein the chip surface of the auxiliary cutting edge is cross-sectionally concavely arched.

6. A milling tool according to claim 3, wherein the length of the auxiliary cutting edge being determined by the extension of the cutting edge line between two end points, amounts to at least ⅛ of the total perimeter of the shim plate.

7. A milling tool according to claim 1, wherein the milling insert has a round basic shape, and the auxiliary cutting edge of the shim plate having a chip surface with a crescent-like contour shape that is determined by an arched cutting edge line.

8. A milling tool according to claim 1, wherein the milling insert has a polygonal basic shape and includes straight cutting edges having flat clearance surfaces, the auxiliary cutting edge of the shim plate being straight and delimited by a flat side surface.

* * * * *